United States Patent [19]

Alper

[11] Patent Number: 5,746,925

[45] Date of Patent: *May 5, 1998

[54] COMPOSITION FOR COAGULATING OIL

[75] Inventor: Hal Alper, Brooklyn, N.Y.

[73] Assignee: Mansfield & Alper, Inc., Gainesville, Ga.

[*] Notice: The term of this patent shall not extend beyond the expiration date of Pat. No. 5,437,793.

[21] Appl. No.: 572,986

[22] Filed: Dec. 15, 1995

Related U.S. Application Data

[60] Continuation-in-part of Ser. No. 506,968, Jul. 28, 1995, Pat. No. 5,698,139, which is a division of Ser. No. 74,114, Jun. 8, 1993, Pat. No. 5,437,793.

[51] Int. Cl.$^6$ .............................. B01J 13/00; C02F 1/54; C02F 1/56

[52] U.S. Cl. .............. 210/728; 210/693; 210/733; 210/925; 252/314; 252/315.1; 252/315.4; 427/212; 427/221; 427/222; 524/313; 524/917; 525/301.5

[58] Field of Search .............. 252/315.1, 315.4, 252/314, 358; 524/313, 917; 210/728, 732, 733, 734, 925, 705; 525/301.5; 427/212, 221, 222

[56] References Cited

U.S. PATENT DOCUMENTS

| | | | |
|---|---|---|---|
| 2,418,920 | 4/1947 | Berger et al. | 252/315.4 X |
| 2,441,068 | 5/1948 | Hewitt et al. | 525/301.5 X |
| 3,067,154 | 12/1962 | Sterling | 524/313 |
| 3,755,189 | 8/1973 | Gilchrist et al. | 252/315.4 X |
| 3,775,448 | 11/1973 | Guhr et al. | 252/315.4 |
| 3,776,864 | 12/1973 | Woerner | 524/313 X |
| 3,821,109 | 6/1974 | Gilchrist et al. | 210/749 |
| 3,835,049 | 9/1974 | King | 210/758 |
| 3,917,528 | 11/1975 | Orban et al. | 210/680 |
| 3,977,969 | 8/1976 | Zall | 210/666 |
| 4,156,040 | 5/1979 | Swider et al. | 427/226 |
| 4,200,561 | 4/1980 | Chang | 524/313 X |
| 4,420,400 | 12/1983 | Weitzen | 210/710 |
| 4,420,573 | 12/1983 | Fogg et al. | 523/333 |
| 4,502,975 | 3/1985 | Kobayashi et al. | 252/315.1 |
| 4,519,918 | 5/1985 | Ericsson et al. | 210/680 |
| 4,786,717 | 11/1988 | Bretches et al. | 528/491 |
| 4,810,395 | 3/1989 | Levy et al. | 252/315.4 X |
| 5,326,394 | 7/1994 | Cobb | 524/313 X |
| 5,382,371 | 1/1995 | Stahl et al. | 507/221 |
| 5,405,932 | 4/1995 | Bender et al. | 528/104 |
| 5,427,612 | 6/1995 | Bender | 106/30 C |
| 5,429,741 | 7/1995 | Webb et al. | 210/242.4 |
| 5,437,793 | 8/1995 | Alper | 210/728 |

FOREIGN PATENT DOCUMENTS 859836 2/1978 Belgium.

OTHER PUBLICATIONS

D. Swern, ed.( ) Bailey's Ind. Oil Fat Prod. vol. 1:687 (1979).

Primary Examiner—Richard D. Lovering
Attorney, Agent, or Firm—Klauber & Jackson

[57] ABSTRACT

The invention discloses methods of making oil coagulant compositions, the oil coagulants made thereby and processes for using the coagulants to coagulate oil that has been spilled on water. The coagulant is made from a glyceride, such as, for example, the drying oil linseed oil, a polymer, such as, for example, isobutyl methacrylate polymer, and a solvent, such as, for example, 2,2,4-trimethyl-1,3-pentanediol monoisobutyrate. The composition of the present invention floats on the water surface and coagulates oil independent of both agitation and temperature, and can be used in both salt and fresh water. After the coagulant has coagulated the spilled oil, the floating coagulated oil can be readily mechanically removed from the water such that at least 99.9% of the oil is removed from the water and only a faint trace of oil remains in the water. An alternate way of using the composition is to impregnate it into a porous substrate, which substrate is then applied to the spilled oil.

37 Claims, 2 Drawing Sheets

COMPOSITION FOR COAGULATING OIL

This application is a continuation-in-part of patent application Ser. No. 08/506,968, filed Jul. 28, 1995, now U.S. Pat. No. 5,698,139, which is a divisional patent application of Ser. No. 08/074,114, filed Jun. 8, 1993, which issued as U.S. Pat. No. 5,437,793.

FIELD OF THE INVENTION

The invention generally relates to a chemical composition that can be used as a coagulant and/or viscoelastic modifier for oil, and a method of making and using the same. More specifically, the invention is drawn to compositions synthesized from particular combinations of glycerides and polymers, which may be further diluted for ease of handling with a solvent, that can be used as a coagulant to coagulate oil spilled on water. The coagulated mass floats on the surface of the water and can be easily scooped or otherwise removed from the water. An embodiment of the invention includes mixing linseed oil with isobutyl methacrylate polymer at a temperature of 400°–700° F. and subsequently adding a solvent to the mixture to facilitate handling. The composition can be applied directly to an oil spill or it can be impregnated upon a porous substrate such as vermiculite that is spread upon the spill.

BACKGROUND OF THE INVENTION

The present invention relates to the treatment of oil slicks and spills on the surface of bodies of water and more particularly, to methods of making and using compositions that will coagulate and/or enhance the viscoelasticity of the spilled oil such that the spilled oil can be readily removed from the water surface.

Unfortunately, repeated incidents of oil spillage in both fresh and salt water are well known. Recent history has evidenced the disastrous results that are caused by oil spills. Spilled oil causes damage to marine life, contamination of the water itself, damage to the shoreline and damage to birds and other wild life that are dependent upon the contaminated water. Because oil spills cause great losses both environmentally and, of course, financially, compositions, methods of making compositions, and methods of using compositions that will control an oil spillage such that spilled oil can be readily removed from a water surface are in great need.

Several methods of controlling oil spills are known. Various mechanical devices such as fences, booms, and skimmers have been used to physically contain or remove oil that has been spilled on a water surface. In addition, several types of oil absorbants have also been used in the past, such as, for example, straw. Various chemical treatments have also been used to either contain or coagulate spilled oil. For example, U.S. Pat. No. 3,755,189 to Gilchrist et al. teaches a composition for the control of oil floating on water that comprises a drying oil, a solvent and a catalyst used in combination as a composition that is able to confine oil that is floating on the surface of water. In addition, U.S. Pat. No. 3,977,967 to Zall teaches a method of containing oil spills that uses a polymer of high molecular weight that is able to gel or coagulate the spilled oil such that the coagulated oil can be easily raked off the surface of the water.

Although the Gilchrist et al. and Zall compositions and methods, and others, teach moderately effective means for removing spilled oil from a water surface, heretofore a method of making a composition, the resulting composition, and a method of using the resulting composition that is able to confine, coagulate and control spilled oil in both calm and rough choppy water has not been known. Due to the nature of oil and water, i.e. the lighter components of oil typically evaporate from the surface of the water in 24–28 hours, and the heavier components of the oil typically sink below the surface of the water and eventually form an emulsion with the water, previous compositions and methods have not been effective in removing the spilled oil from the water surface, especially in rough waters.

A novel composition is herein disclosed comprising a thermal reaction product between a natural glyceride and a synthetic polymer that is useful as a coagulant. Blends of a soft elastomeric polymer with a glyceride useful as adhesives and sealing compounds are disclosed in U.S. Pat. No. 3,067,154 to Sterling. Therein, a compound is taught that is a blend of 10 to 50 parts by weight of the final composition elastomeric polymer with 5 to 25 parts by weight of the final composition oil, and other ingredients such as talc, clay, and solvent. The mixture taught by Sterling is a simple mixture of compounds that is not subjected to thermal reaction conditions. Sterling's mixture will not work to coagulate oil on water so that the oil can be easily removed from the water.

SUMMARY OF THE INVENTION

In U.S. Pat. No. 5,437,793, a coagulant product is disclosed comprising linseed oil chemically reacted with isobutyl methacrylate polymer and diluted with a solvent such as 2,2,4-trimethyl-1,3-pentanediol monoisobutyrate. The composition formed by the thermal reaction of the linseed oil with the isobutyl methacrylate polymer is a soft resinous product which, when diluted with the solvent, results in a mixture that can be sprayed onto an oil spill or otherwise introduced to the oil spill to coagulate the oil. Further experimentation has led to the discovery of new products produced from methacrylate polymers and a variety of natural animal and vegetable oils. The oil and the polymer are reacted in a thermal reaction that does not appear to be sensitive to the atmosphere under which the reaction is carried out, i.e. whether it is an inert, oxidizing or reducing atmosphere. Compositions have been prepared with an oil to polymer ratio ranging from about 3:1 to 1:1, resulting in products exhibiting physical properties ranging from soft to hard, and elastomeric to brittle in nature depending upon the ratio of the oil to polymer and the choice of polymer and/or oil used.

Compositions are disclosed comprising thermal reaction products of methacrylate polymers and a variety of natural animal and vegetable oils. The thermal reaction of the polymer and oil or glyceride results in a homogeneous composition. Thus, any polymer and oil can be utilized in the composition as long as a homogeneous product is obtained after the thermal reaction. That is, the compositions of the invention consist essentially of a homogeneous thermal reaction product of a natural glyceride and a polymer.

In particular, suitable oils have been shown to be sunflower, cottonseed, tung, soybean, linseed, fish oil and the like. The oil is combined with a methacrylate polymer such as a polymer derived from ethyl methacrylate, methyl methacrylate, isobutyl methacrylate, or n-butyl methacrylate to yield products having a variety of physical properties. Each reaction produces a product with characteristics different from either of the starting materials or a simple mixture of the two starting materials, thus showing that a new composition is produced by the thermal reaction. Specifically, the glyceride/polymer products of the present invention pass a clear pill test after being heated at the elevated temperature and do not separate into two parts upon being cooled but, rather form a homogenous, uniphase compound.

To use the composition it can be diluted with any appropriate solvent and sprayed upon an oil spill. The composition coagulates the spilled oil such that the coagulated oil floats on the surface of the water. Alternatively, the solvated composition can be sprayed upon or otherwise introduced to a porous substrate, whereupon the solvent will evaporate, leaving the glyceride/polymer composition impregnated in the substrate. This impregnated substrate can then be spread upon an oil spill where it causes coagulation of the oil and allows for easy collection of the coagulated oil, which typically floats on the surface of the water.

It is therefore an object of the present invention to provide a method of making a composition, the composition itself, and a method for using the composition; the composition having the ability to coagulate oil and in particular, fuel oil, crude oil, and non-detergent motor oil.

It is also an object of the present invention to provide a composition that will coagulate both the heavy and light components of oil, and will float on the surface of the water, thereby preventing the heavier oil components from sinking beyond recovery, or forming an emulsion with the water.

It is also an object of the present invention to provide a method for making the glyceride and polymer composition of the present invention and further providing a method of diluting the composition to provide a coagulant product that is easy to use and a method of using the composition of the invention impregnated in a substrate.

It is a further object of the present invention to provide a composition that is able to coagulate oil spills at various temperatures and types of water in which the spill has occurred.

It is yet another object of the present invention to provide a coagulant composition that removes 99.9% of the oil spilled in water such that only a trace amount, if any, remains.

DETAILED DESCRIPTION

The present invention entails a method of making a unique composition, the composition itself, and a method for using the composition to coagulate oil spills. The composition is synthesized from a natural oil or glyceride and a polymer such as a methacrylate polymer. The composition can be diluted with a solvent so that it is easier to handle. In a preferred embodiment, the coagulant product is synthesized from linseed oil or sunflower oil and isobutyl methacrylate polymer, and diluted with 2,2,4-trimethyl-1,3-pentanediol monoisobutyrate.

The oil/glyceride component of the composition can be derived from vegetable or animal origin. Vegetable oils are obtained by cold pressing the seeds of a plant to obtain the oil contained therein. Of the vegetable oils, drying oils such as linseed, sunflower, and tung oil; and semi-drying oils such as soybean and cottonseed oil have been shown to be useful as the glyceride component of the invention. Animal oils such as, for example, fish oil, tallow and lard can also be used as the glyceride component of the invention. It is anticipated that any drying oil or semi-drying oil will work in the invention. Generally, a drying oil is defined as a spreadable liquid that will react with oxygen to form a comparatively dry film. Combinations of glycerides can be used to advantage in the invention.

The oil/glyceride component of the composition is preferably a drying oil such as linseed oil that can be obtained from Cargill, Inc. as Supreme Linseed Oil, or sunflower oil. The glyceride should comprise from about 50–85%, or most preferably, from about 72–77% of the glyceride/polymer composition. All percentages in this disclosure are by weight, unless otherwise stated.

The polymer component of the composition is a synthetic polymer such as polymers derived from methacrylates. Preferably the polymer is derived from methyl methacrylate, ethyl methacrylate, isobutyl methacrylate, or n-butyl methacrylate. Most preferably, the polymer is isobutyl methacrylate polymer that can be obtained from ICI Acrylics as ELVACITE® 2045. However, it is anticipated that any polymer is potentially useable in the invention with at least one or more glyceride. Combinations of polymers can be used to advantage in the invention.

The test used to determine whether or not a polymer can be used in accordance with the present invention is to combine the polymer in question with a glyceride, as set forth herein, to see if the glyceride/polymer combination forms a homogenous product after heating. Ideally, the polymer percentage of the glyceride/polymer composition should range from about 15–50%, preferably 20–40%, or more preferably from about 23–28%.

The glyceride/polymer composition can be used by itself in some applications or it can be diluted with a solvent. The amount of the solvent used will vary depending upon the relative percentage of glyceride in the glyceride/polymer composition. For example, if more glyceride is present the composition will be more fluid and less solvent need be used. The solvent, or diluent, component of the coagulant product should generally comprise any liquid or mixture of liquids that is able to dissolve or dilute the glyceride/polymer composition. The solvent/diluent should control the evaporation, desired flow and coalescing of the intermediate composition. And, in consideration of marine life, the toxicity of the solvent must be considered. More specifically, the solvent can be selected from aliphatic hydrocarbons, aromatic hydrocarbons, alcohols, ketones, ethers, aldehydes, phenols, carboxylic acids, synthetic chemicals and naturally occurring substances.

In one embodiment, the solvent component of the coagulant can also be a previously specified glyceride where the composition is approximately 100 percent solids. In this case, toxicity from solvents is virtually eliminated and a product that is extremely viscous is formed that can be useful in certain applications.

In a most preferred embodiment, the solvent is 2,2,4-trimethyl-1,3-pentanediol monoisobutyrate. The preferred amount of the solvent is about 50% of the coagulant product, although the total solvent percentage of the coagulant product can range from about 35 to about 95%.

Methods of Making the Coagulant:

The glyceride/polymer composition of the present invention is obtained through a thermal reaction process. The first step of the process involves heating the glyceride to approximately 235°–350° F. at a rate of about 5° F. per minute with continuous stirring. Then, the polymer, usually in powdered form, is slowly stirred into the glyceride. As stated above, the glyceride should range from about 50–85%, preferably about 65–80%, more preferably about 72–77%, and the polymer should range from about 1–50%, preferably about 20–40%, more preferably about 23–28% of the glyceride/polymer composition. After this mixture has been mixed properly, the mixture should be heated to approximately 400°–700° F., depending on the polymer/glyceride components.

The mixture should be heated at that temperature until a clear pill test indicates that the reaction has reached its end point, i.e. a drop of the reaction mixture when placed on a clear glass plate is clear. When a clear pill test indicates that the reaction has reached its end-point, the mixture should be cooled to a temperature below 200° F., generally about 180° F. After cooling, the solvent component of the coagulant product can be added to the reaction mixture to form a more liquid product that is easier to handle and use. The temperature at which the solvent is added is not critical, but the solvent should be added at a temperature where the glyceride/polymer composition is still pliable and the solvent will not rapidly evaporate.

If the glyceride/polymer mixture separates into two phases upon cooling it is not useful as a coagulant. In this manner, any polymer can be tested for use in the invention.

The diluted coagulant product made according to the above-described process generally has the following properties:

| | |
|---|---|
| boiling point | variable, depending upon ingredient types and amounts |
| appearance | pale yellow clear oily liquid |
| odor | very mild |
| water solubility | negligible |
| non-volatile material | 0–50% |
| flash point | variable, depending upon ingredient types and amounts |
| flammability | combustible liquid |
| viscosity | 230 to 4740 cps |

Methods of Using the Coagulant:

The glyceride/polymer composition can be used to coagulate spilled oil and to cause the coagulated oil to float through a process of generally applying the composition to the surface of the oil spill. The composition can be handled more easily when it is diluted with an appropriate solvent, but in certain cases it can be preferable to apply the glyceride/polymer composition directly. The diluted coagulant product can be sprayed on top of the oil spill from a plane or boat, or the coagulant can be introduced at only one site, or an edge of the spill. When the coagulant is sprayed on top of the oil spill, no agitation is required in order for the coagulant to coagulate the spilled oil. When the coagulant is introduced at a site of the oil spill, however, agitation may be required depending upon the wave action of the water in combination with the properties of the coagulant, i.e. the wave action can be sufficient to spread the coagulant throughout the oil spill. Preferably, the amount of coagulant used in terms of the amount of spilled oil should be from 5 to 15% of the spilled oil. Our studies have shown that if, as compared to the amount of oil spilled, an amount of coagulant equal to 5% of the spilled oil is used, the coagulant will remove 99% of the spilled oil. If an amount of coagulant is used that is equal to 10 to 15% of the spilled oil, the coagulant will remove 99.9% of the spilled oil. When 99.9% of the spilled oil has been coagulated and removed only a trace amount of oil remains in the water.

A unique feature of the present coagulant and the methods of using the coagulant is that no agitation is required to mix the coagulant with the spilled oil when the coagulant is sprayed on top of the oil spill. In addition, as stated, if the coagulant is introduced at the side of the spill, depending upon the wave action of the water in combination with the nature of the coagulant used agitation may not be required because the wave action may be sufficient to disperse the coagulant throughout the spill. And, when agitation has been used to simulate very rough waters, the coagulant acts very quickly (less than one (1) minute) to coagulate both the light and heavy components of the spilled oil despite extreme agitation.

Another unique feature of the invention is that both the glyceride/polymer compositions of the present invention and the resulting coagulated oil mass float on top of the water and remain on the surface of the water despite tremendous agitation or wave motion. This flotation aspect of the present invention makes it easier to remove the coagulated oil from the water.

In addition, our studies have also shown that the coagulant and methods of using the same will coagulate oil that has been spilled on water regardless of water or air temperature, and the coagulant works in both salt water and fresh water. After the coagulant has coagulated the spilled oil, the floating admixture should simply be removed from the water by any mechanical means such as, for example, scooping type devices, that are well known in the art.

Another method of using the coagulant product is to impregnate it in or on a porous substrate that is then distributed across an oil spill. The porous substrate can be any substrate having a high surface area and the capacity to absorb the product. However, the porous substrate should not negatively affect the coagulation process or chemistry of the coagulant product. Examples of suitable substrates are vermiculite, wood chips, wood pulp, paper, STYROFOAM®, silicas, kaolin, chicken feathers, zeolite, aluminas, calcium carbonate, and natural and synthetic fibers.

The compositions can be applied to the porous substrate before or after the composition's dilution with solvent. The composition (or diluted composition) is sprayed onto or mixed with the substrate at ratios from about 10% to 200% w/w composition/substrate. The impregnated substrate is then dried. It is anticipated that the impregnations could be accomplished on a larger scale using equipment such as a Henshel mixer or V-blender.

The following examples demonstrate various combinations of glycerides, polymers, and solvents that give the desired properties of the invention. The examples demonstrate exemplary embodiments of the present invention and are not intended to be construed as limiting the scope of the invention.

EXAMPLES

Example 1

1000 g of supreme linseed oil was charged to a three neck, round bottom flask, equipped with a glass agitator, reflux condenser, Deanstark trap, and Nitrogen sparge line. The flask was insulated with glass wool, and the bottom was covered with a heating mantel. A nitrogen line and agitator were then turned on, and the flask was heated to 235° F. at a rate of 4° F. per minute. When the temperature reached 235° F., 340 g of du Pont Elvacite 2045 isobutyl methacrylate polymer was charged slowly. The flask was continuously heated to a temperature range of 425°–450° F. at a rate of 2° F. per minute with continuous stirring. While heating, clear pill tests were conducted to determine the reaction endpoint. When a clear pill test indicated that the reaction was completed it was then cooled down by removing the heating mantel. When cooled to approximately 180° F., 1340 g of 2,2,4-trimethyl-1,3-pentanediol monoisobutyrate was charged. Cooling was continued down to 150° F. The batch was then filtered using a 200 micron filter bag, cooled to room temperature and stored.

The following reactions were carried out generally by the same method. In the following descriptions, only the type and amount of ingredients and the atmosphere are listed.

Example 2

| | |
|---|---|
| glyceride | 1000 g soybean oil |
| polymer | 340 g methyl methacrylate polymer |
| atmosphere | $N_2$ |
| solvent | 1340 g anhydrous isopropanol |

Example 3

| | |
|---|---|
| glyceride | 1000 g soybean oil |
| polymer | 1000 g isobutyl methacrylate polymer |
| atmosphere | $N_2$ |
| solvent | 2000 g 2,2,4-trimethyl-1,3-pentanediol monoisobutyrate |

Example 4

| | |
|---|---|
| glyceride | 1000 g linseed oil |
| polymer | 680 g ethyl methacrylate/methacrylate copolymer |
| atmosphere | $CO_2$ |
| solvent | 1680 g 2,2,4-trimethyl-1,3-pentanediol monoisobutyrate |

Example 5

| | |
|---|---|
| glyceride | 1000 g linseed oil |
| polymer | 680 g isobutyl methacrylate polymer |
| atmosphere | air |
| solvent | 1680 g 2,2,4-trimethyl-1,3-pentanediol monoisobutyrate |

Example 6

| | |
|---|---|
| glyceride | 1000 g linseed oil |
| polymer | 500 g isobutyl methacrylate polymer |
| atmosphere | $CO_2$ |
| solvent | 1500 g 2,2,4-trimethyl-1,3-pentanediol monoisobutyrate |

Example 7

| | |
|---|---|
| glyceride | 1000 g sunflower oil |
| polymer | 1000 g isobutyl methacrylate polymer |
| atmosphere | $N_2$ |
| solvent | 2000 g propylene glycol monomethyl ether |

Example 8

| | |
|---|---|
| glyceride | 1000 g sunflower oil |
| polymer | 340 g isobutyl methacrylate polymer |
| atmosphere | air |
| solvent | 1340 g 2,2,4-trimethyl-1,3-pentanediol monoisobutyrate |

Example 9

| | |
|---|---|
| glyceride | 1000 g tung oil |
| polymer | 340 g isobutyl methacrylate polymer |
| atmosphere | $N_2$ |
| solvent | 1340 g 2,2,4-trimethyl-1,3-pentanediol monoisobutyrate |

Example 10

| | |
|---|---|
| glyceride | 1000 g soybean oil |
| polymer | 340 g isobutyl methacrylate polymer |
| atmosphere | air |
| solvent | 1340 g propylene glycol monomethyl ether |

Example 11

| | |
|---|---|
| glyceride | 1000 g tung oil |
| polymer | 440 g ethyl methacrylate/methacrylate copolymer |
| atmosphere | $CO_2$ |
| solvent | 1440 g 2,2,4-trimethyl-1,3-pentanediol monoisobutyrate |

Example 12

| | |
|---|---|
| glyceride | 1000 g sunflower oil |
| polymer | 680 g isobutyl methacrylate polymer |
| atmosphere | $CO_2$ |
| solvent | 1680 g 2,2,4-trimethyl-1,3-pentanediol monoisobutyrate |

Example 13

| | |
|---|---|
| glyceride | 1000 g linseed oil |
| polymer | 340 g n-butyl methacrylate |
| atmosphere | air |
| solvent | 1340 g isopropanol |

Example 14

| | |
|---|---|
| glyceride | 1000 g fish oil |
| polymer | 340 g isobutyl methacrylate |
| atmosphere | air |
| solvent | 1340 g isopropanol |

Example 15

| | |
|---|---|
| glyceride | 1000 g tung oil |
| polymer | 340 g n-butyl methacrylate |
| atmosphere | air |
| solvent | 1340 g isopropanol |

Example 16

| | |
|---|---|
| glyceride | 500 g tung oil/500 g fish oil |
| polymer | 340 g isobutyl methacrylate |
| atmosphere | air |
| solvent | 1340 g isopropanol |

Example 17

| | |
|---|---|
| glyceride | 500 g tung oil/500 g linseed oil |
| polymer | 340 g n-butyl methacrylate/170 g isobutyl methacrylate |
| atmosphere | air |
| solvent | 1340 g isopropanol |

Example 18

| | |
|---|---|
| glyceride | 500 g fish oil/500 g sunflower oil |
| polymer | 170 g n-butyl methacrylate/170 g isobutyl methacrylate |
| atmosphere | air |
| solvent | 1340 g isopropanol |

Example 19

| | |
|---|---|
| glyceride | 500 g soybean oil/500 g tung oil |
| polymer | 170 g n-butyl methacrylate/170 g isobutyl methacrylate |
| atmosphere | air |
| solvent | 1340 g isopropanol |

Example 20

| | |
|---|---|
| glyceride | 500 g fish oil/500 g soybean oil |
| polymer | 170 g n-butyl methacrylate/170 g isobutyl methacrylate |
| atmosphere | air |
| solvent | 1340 g isopropanol |

Example 21

Each of the above Examples 2–12, after the addition of solvent, was mixed with 1) vermiculite; 2) packing paper; 3) wood chips; and 4) STYROFOAM®. The compositions were added to the substrates at weight to weight ratios of 20% (vermiculite), 200% (paper), 20% (wood chips) and the saturation point (STYROFOAM®). The solutions were mixed with the substrate and the so impregnated substrate was dried.

Example 22

The protocol of Example 21 was carried out on the compositions of Examples 2, 6, 10, 11 and 12 prior to solvent being added thereto. The glyceride/polymer compositions were added to the substrate when the composition was still warm and liquid at weight to weight ratios of 10% (vermiculite), 100% (paper), 10% (wood chips) and the saturation point (STYROFOAM®).

Example 23

Coconut oil (a non-drying oil) was used in 3:1 and 1:1 ratios with isobutyl methacrylate polymer and in a 4.2:1 ratio with ethyl methacrylate/methacrylate copolymer. The coconut oil/ethyl methacrylate/methacrylate copolymer combination separated out upon cooling and was thus not useful. The other coconut oil combinations formed a homogenous product, but the product did not function well as a coagulant.

Example 24

| | |
|---|---|
| glyceride | 340 g linseed oil |
| polymer | 1000 g ethyl methacrylate/methacrylate copolymer |
| atmosphere | $N_2$ |

Example 25

| | |
|---|---|
| glyceride | 1000 g linseed oil |
| polymer | 500 g ethyl methacrylate/methacrylate copolymer |
| atmosphere | air |

Example 26

| | |
|---|---|
| glyceride | 1000 g linseed oil |
| polymer | 500 g methyl methacrylate/methacrylate copolymer |
| atmosphere | $CO_2$ |

Example 27

| | |
|---|---|
| glyceride | 1000 g sunflower oil |
| polymer | 340 g ethyl methacrylate/methacrylate copolymer |
| atmosphere | $CO_2$ |

Example 28

| | |
|---|---|
| glyceride | 1000 g sunflower oil |
| polymer | 340 g ethyl methacrylate/methacrylate copolymer |
| atmosphere | $N_2$ |

Example 29

| | |
|---|---|
| glyceride | 1000 g sunflower oil |
| polymer | 1000 g ethyl methacrylate/methacrylate copolymer |
| atmosphere | air |

Example 30

| | |
|---|---|
| glyceride | 1000 g soybean oil |
| polymer | 1000 g ethyl methacrylate/methacrylate copolymer |
| atmosphere | air |

RESULTS:

Examples 1 and 2

The combinations of Examples 1 and 2 yielded homogenous glyceride/polymer compositions that did not separate into two component mixtures upon cooling. The glyceride/polymer compositions dissolved readily into the solvent to yield oily liquids ranging in viscosity from about 230 to 4740 cps.

Samples of the glyceride/polymer/solvent coagulant products prepared according to Examples 1–2 were supplied to Leberco Testing Incorporated to determine the coagulant's ability to coagulate spilled oil. The coagulant product was evaluated for its coagulating properties in cold fresh water and cold simulated salt water in which an oil spill was simulated. The coagulant was evaluated for its ability to remove non-detergent motor oil; number 6 fuel oil; heavy crude bottoms; sour crude; sweet crude; and number 2 fuel oil.

The testing procedure used tap water at 20° C. and at 10° C. and simulated salt water prepared in accordance with ASTM D1141 (Substitute Ocean Water) also at 20° C. and 10° C. The oil concentration on the water was at 1–10% of the water volume. The coagulants were evaluated at from 1–15% by volume of the oil concentration with agitation times ranging from 1–3 minutes and coagulation times at 0.5 and 2 minutes. Following the addition of the coagulant and the agitation, and after the coagulation time allowed, the oil-coagulant admixture product floated on the top of the water and was removed by mechanical means of scooping it out.

It was observed that: (a) temperature and water type were not factors; (b) agitation time and coagulation time were also not major factors; and (c) the coagulant product concentration of 1–15% to oil was adequate, however, the larger percentage would remove 99.9% of the oil and the lower percentage would remove about 99% of the oil. The findings indicate that coagulant concentrations of 5% to oil concentration generates oil removal of better than 99%. Concentration of 10–15% of coagulant to oil generates oil removal better than 99.9% with only a faint trace of oil remaining on the water surface.

Examples 3–12

The products of Examples 3–12 also were homogenous compositions which did not separate into two part mixtures upon cooling. These products, as well as those of examples 1 and 2, had a consistency ranging from thick liquid to semi-solid to solid upon cooling. The semi-solid and solid products ranged from hard thermoplastic resin-like to soft elastic adhesive-like. These products were tested by the following method. 20 g of "spilled" oil was added to a vessel containing 100 g of water. Coagulant was added in concentrations ranging from 1–10% w/w of oil. Coagulated oil was removed by mechanical means and by using a separatory funnel. The remaining water was weighed and percent gain calculated. The oils tested were #6 fuel oil; crude oil, crude bottoms; Lago Treco crude; Pilon crude; and 10W40 motor oil. The results are summarized in Table 1.

TABLE 1

| | % Oil Remaining | | | | |
|---|---|---|---|---|---|
| Ex. # | Pilon Crude | Lago Treco | #6 | Bunker Crude | 10W40 Motor Oil |
| 3 | <1% | <1% | <1% | <1% | <1% |
| 4 | <1% | <1% | <1% | <1% | <1% |
| 5 | <1% | <1% | <1% | <1% | <1% |
| 6 | <1% | <1% | <1% | <1% | <1% |
| 7 | not tested | | | | |
| 8 | <1% | <1% | <1% | <1% | <1% |
| 9 | <0.5% | <0.5% | <0.5% | <0.5% | <0.5% |
| 10 | not tested | | | | |
| 11 | <1% | <1% | <1% | <1% | <1% |
| 12 | <1% | <1% | <1% | <1% | <1% |

The results indicate that the coagulants were effective with all oils tested. The addition of the coagulant to the "spilled" oil quickly caused coagulated masses, which floated on the surface of the water and were easily removed as gummy masses that were attached to the impeller mixing blade, or were easily scoopable so that the coagulated oil was removed with a flat blade or spoon.

Examples 13–20

The products of Examples 13–20 were homogeneous compositions which did not separate into two part mixtures upon cooling off. The products were tested as coagulants following the same procedure used for Examples 3–12. These products functioned very effectively as coagulants.

Example 21

The impregnated substrates' ability to coagulate oil was tested in the procedure described above for Examples 3–12. The results are summarized in Table 2.

TABLE 2

| | | % Oil Remaining | | | | |
|---|---|---|---|---|---|---|
| Glyceride/ Polymer/ Solvent Combination | Substrate | Pilon Crude | Lago Treco | #6 | Bunker Crude | 10W40 Motor Oil |
| 2 | vermiculite | <0.5% | <0.5% | <0.5% | <0.5% | <0.5% |
| | paper | <0.5% | <0.5% | <0.5% | <0.5% | <0.5% |
| | wood chips | <0.5% | <0.5% | <0.5% | <0.5% | <0.5% |
| | STYROFOAM® | <0.5% | <0.5% | <0.5% | <0.5% | <0.5% |
| 3 | vermiculite | <1% | <1% | <1% | <1% | <1% |
| | paper | <1% | <1% | <1% | <1% | <1% |
| | wood chips | <1% | <1% | <1% | <1% | <1% |
| | STYROFOAM® | <1% | <1% | <1% | <1% | <1% |
| 4 | vermiculite | <0.5% | <0.5% | <0.5% | <0.5% | <0.5% |
| | paper | <0.5% | <0.5% | <0.5% | <0.5% | <0.5% |
| | wood chips | <0.5% | <0.5% | <0.5% | <0.5% | <0.5% |
| | STYROFOAM® | <0.5% | <0.5% | <0.5% | <0.5% | <0.5% |
| 5 | vermiculite | <0.5% | <0.5% | <0.5% | <0.5% | <0.5% |
| | paper | <0.5% | <0.5% | <0.5% | <0.5% | <0.5% |
| | wood chips | <0.5% | <0.5% | <0.5% | <0.5% | <0.5% |
| | STYROFOAM® | <0.5% | <0.5% | <0.5% | <0.5% | <0.5% |
| 6 | vermiculite | <1% | <1% | <1% | <1% | <1% |
| | paper | <1% | <1% | <1% | <1% | <1% |
| | wood chips | <1% | <1% | <1% | <1% | <1% |

TABLE 2-continued

% Oil Remaining

| Glyceride/ Polymer/ Solvent Combination | Substrate | Pilon Crude | Lego Treco | #6 | Bunker Crude | 10W40 Motor Oil |
|---|---|---|---|---|---|---|
|  | STYROFOAM® | <1% | <1% | <1% | <1% | <1% |
| 7 | vermiculite | <1% | <1% | <1% | <1% | <1% |
|  | paper | <1% | <1% | <1% | <1% | <1% |
|  | wood chips | <1% | <1% | <1% | <1% | <1% |
|  | STYROFOAM® | <1% | <1% | <1% | <1% | <1% |
| 8 | vermiculite | <1% | <1% | <1% | <1% | <1% |
|  | paper | <1% | <1% | <1% | <1% | <1% |
|  | wood chips | <1% | <1% | <1% | <1% | <1% |
|  | STYROFOAM® | <1% | <1% | <1% | <1% | <1% |
| 9 | vermiculite | <0.5% | <0.5% | <0.5% | <0.5% | <0.5% |
|  | paper | <0.5% | <0.5% | <0.5% | <0.5% | <0.5% |
|  | wood chips | <0.5% | <0.5% | <0.5% | <0.5% | <0.5% |
|  | STYROFOAM® | <0.5% | <0.5% | <0.5% | <0.5% | <0.5% |
| 10 | vermiculite | <1% | <1% | <1% | <1% | <1% |
|  | paper | <1% | <1% | <1% | <1% | <1% |
|  | wood chips | <1% | <1% | <1% | <1% | <1% |
|  | STYROFOAM® | <1% | <1% | <1% | <1% | <1% |
| 11 | vermiculite | <1% | <1% | <1% | <1% | <1% |
|  | paper | <1% | <1% | <1% | <1% | <1% |
|  | wood chips | <1% | <1% | <1% | <1% | <1% |
|  | STYROFOAM® | <1% | <1% | <1% | <1% | <1% |
| 12 | vermiculite | <1% | <1% | <1% | <1% | <1% |
|  | paper | <1% | <1% | <1% | <1% | <1% |
|  | wood chips | <1% | <1% | <1% | <1% | <1% |
|  | STYROFOAM® | <1% | <1% | <1% | <1% | <1% |

In all cases, the coagulated mass floated on top of the water and the amount of residual oil after scooping was less than 1%. The substrate impregnated product needed no agitation.

Example 22

The results are summarized in Table 3.

TABLE 3

% Oil Remaining

| Glyceride/ Polymer Combination | Substrate | Pilon Crude | Lego Treco | #6 | Bunker Crude | 10W40 Motor Oil |
|---|---|---|---|---|---|---|
| 2 | vermiculite | <1% | <1% | <1% | <1% | <1% |
|  | paper | <1% | <1% | <1% | <1% | <1% |
|  | wood chips | <1% | <1% | <1% | <1% | <1% |
|  | STYROFOAM® | <1% | <1% | <1% | <1% | <1% |
| 6 | vermiculite | <1% | <1% | <1% | <1% | <1% |
|  | paper | <1% | <1% | <1% | <1% | <1% |
|  | wood chips | <1% | <1% | <1% | <1% | <1% |
|  | STYROFOAM® | <1% | <1% | <1% | <1% | <1% |
| 10 | vermiculite | <1% | <1% | <1% | <1% | <1% |
|  | paper | <1% | <1% | <1% | <1% | <1% |
|  | wood chips | <1% | <1% | <1% | <1% | <1% |
|  | STYROFOAM® | <1% | <1% | <1% | <1% | <1% |
| 11 | vermiculite | <1% | <1% | <1% | <1% | <1% |
|  | paper | <1% | <1% | <1% | <1% | <1% |
|  | wood chips | <1% | <1% | <1% | <1% | <1% |
|  | STYROFOAM® | <1% | <1% | <1% | <1% | <1% |
| 12 | vermiculite | <1% | <1% | <1% | <1% | <1% |
|  | paper | <1% | <1% | <1% | <1% | <1% |
|  | wood chips | <1% | <1% | <1% | <1% | <1% |
|  | STYROFOAM® | <1% | <1% | <1% | <1% | <1% |

In all cases, the coagulated mass floated on top of the water and the amount of residual oil after scooping was less than 1%.

Example 23

These glyceride/polymer compositions did not function as coagulants. When combined with the "spilled" oil the compositions did not interact with the oil, but rather remained separate.

Examples 24–30

These Examples initially were not tested as coagulants because they did not form homogenous products, but rather separated into two parts upon cooling off. Thus, apparently the thermal reaction does not occur between these specific glyceride and polymer combinations at the temperatures used for the other examples. However, when these examples were reacted at temperatures ranging from about 500° to 700° F. homogenous products did result which functioned as coagulants.

The above Examples 2–12 glyceride/polymer compositions were also diluted 50:50 with the following solvents: propylene glycol monomethyl ether, available under the trade name DOWANOL PM; 2,2,4-trimethyl-1,3-pentanediol monoisobutyrate, available under the trade names TEXONOL and FILMER IBT; isopropyl alcohol; and mineral spirits or aliphatic hydrocarbons, available under the trade name SHELSOL 340. The coagulants prepared with these solvents also removed >99% of "spilled" oil. Acetone is a preferred solvent to use for compositions that are used to impregnate substrates.

ANALYSIS

The mechanism of the thermal reaction is unclear at this point but appears to be a polymerization or phase transition reaction brought about by heat and which is stable at lower temperatures. It is hypothesized that perhaps elevated temperatures create monomer free radicals of the polymers and copolymers which then crosslink with the unsaturated glyceride molecules. It is also hypothesized that perhaps a phase transition is occurring between the glyceride and polymer. In an effort to determine what type of interaction or reaction is occurring between the glyceride and the polymer, thermal analysis of several of the Example products was conducted. The results indicate that a reaction is occurring between the glyceride and the polymer.

Differential scanning calorimetry (DSC) was performed on Examples 9 and 10. DSC is a thermal analysis technique that measures the quantity of energy absorbed or evolved by a sample in calories as its temperature is changed. The sample and a reference material are heated at a programmed rate. At a transition point in the sample's heating, such as when it reaches a melting point, the sample requires more or less energy than the reference to heat. These points are indicated on the typical DSC readout.

Figure 1A:
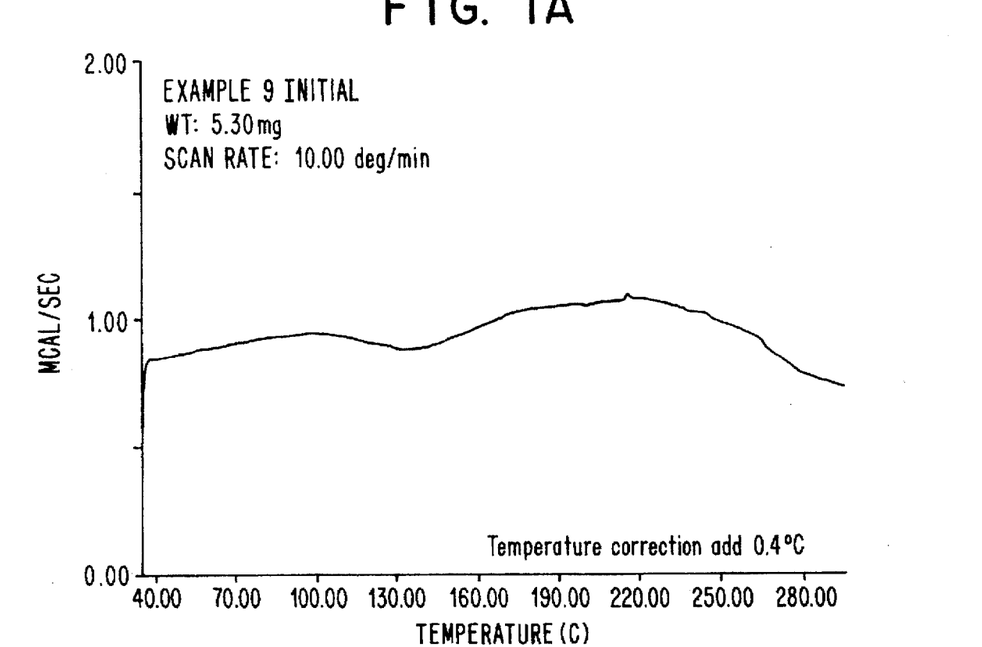
FIG. 1A is a differential scanning calorimetry (DSC) profile of the starting materials of Example 9.
Figure 1B:
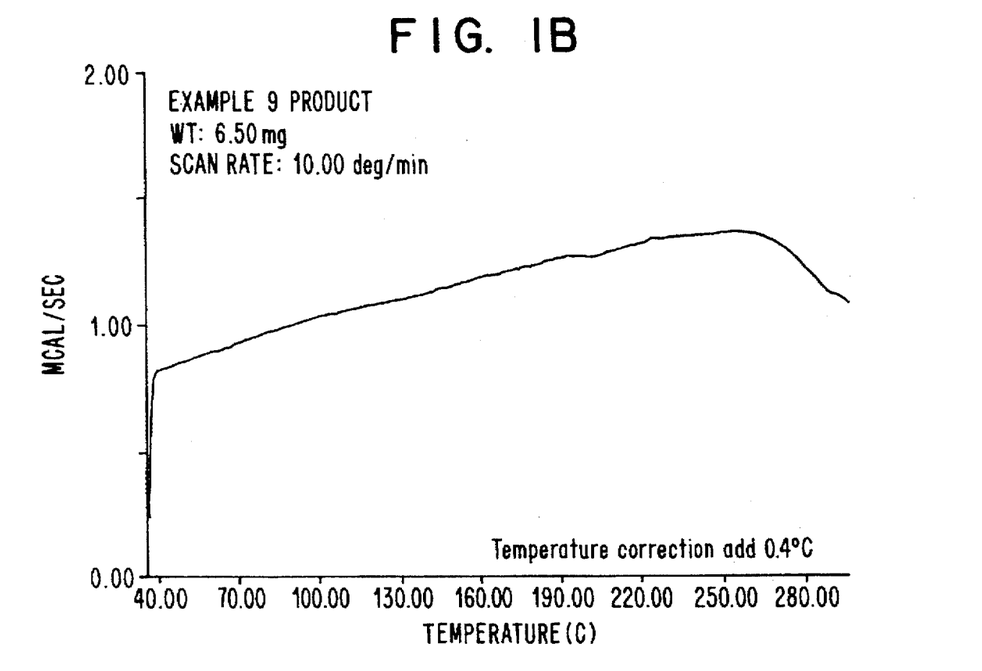
FIG. 1B is a DSC profile of the product of Example 9.

Samples were taken at the beginning of the reaction procedure described earlier and at the end of the reaction. As shown in FIG. 1A, the DSC profile for the initial starting materials of Example 9 is dramatically different from the profile of the product (FIG. 1B). The initial profile shows two exothermic events when the DSC analysis is carried out from 40°–280° C., one event occurring at about 100° C. and the other at about 217° C. In the DSC profile of the reaction product, however, there is only one exothermic event, occurring at about 261° C. The samples were taken at initial and final points during the reaction and allowed to cool to room temperature before being subjected to the DSC.

Figure 1C:
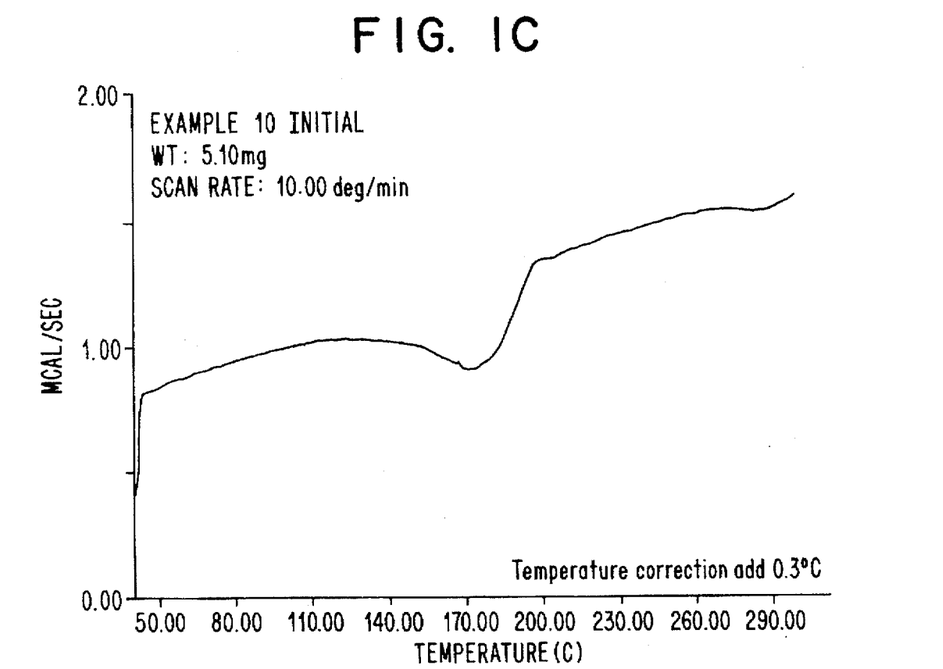
FIG. 1C is a DSC profile of the starting materials of Example 10.
Figure 1D:
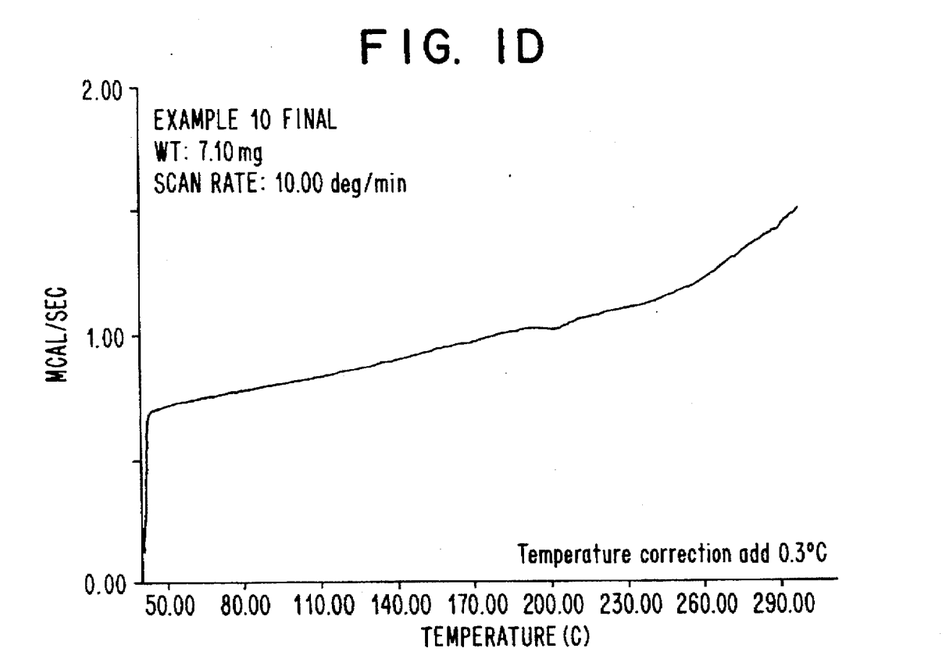
FIG. 1D is a DSC profile of the product of Example 10.

FIGS. 1C and 1D illustrate DSC's of the starting materials and final product of Example 10. Again, the DSC curves generated show that two thermal events occurred for the "just mixed" reactants while only one thermal event occurred for the final product. Thus, the DSCs indicate that there is some reaction or phase transformation taking place.

The invention has been described in detail with particular reference to the preferred embodiments. It will be understood that variations and modifications can be effected within the spirit and scope of the invention and the claims appended hereto. For example, while the invention is described as a thermal reaction product it is anticipated that the inventive compositions could be obtained in a different way, such as by free-radical catalysis or the use of photo-sensitive reaction initiators.

What is claimed is:

1. An oil coagulant, comprising a homogeneous thermal reaction product of a natural glyceride and a methacrylate or acrylate polymer.

2. The oil coagulant of claim 1, wherein said polymer is a methacrylate polymer.

3. The oil coagulant of claim 1, wherein said natural glyceride is selected from the group consisting of drying oils and semi-drying oils.

4. The oil coagulant of claim 1, wherein said natural glyceride is selected from the group consisting of linseed oil, sunflower oil, tung oil, fish oil, cottonseed oil, soybean oil, and combinations thereof.

5. The oil coagulant of claim 1, wherein said polymer is derived from monomers selected from the group consisting of isobutyl methacrylate, methyl methacrylate, ethyl methacrylate, and n-butyl methacrylate and combinations thereof.

6. The oil coagulant of claim 1, wherein said polymer is isobutyl methacrylate polymer.

7. The oil coagulant of claim 1, further comprising a solvent.

8. An oil coagulant, comprising a homogeneous thermal reaction product of about 50–85 parts by weight natural glyceride and about 15–50 parts by weight methacrylate or acrylate polymer.

9. The oil coagulant of claim 8, wherein said polymer is a methacrylate polymer.

10. The oil coagulant of claim 8, wherein said natural glyceride is between about 72–77 parts by weight and said polymer is between about 23–28 parts by weight.

11. The oil coagulant of claim 8, wherein said natural glyceride is selected from the group consisting of linseed oil, sunflower oil, tung oil, fish oil, cottonseed oil, soybean oil, and combinations thereof.

12. The oil coagulant of claim 8, wherein said polymer is derived from one or more monomers selected from the group consisting of isobutyl methacrylate, methyl methacrylate, ethyl methacrylate, and n-butyl methacrylate and combinations thereof.

13. The oil coagulant of claim 8, wherein said polymer is isobutyl methacrylate polymer.

14. The oil coagulant of claim 8, further comprising a solvent.

15. A method of forming a chemical composition from a natural glyceride and a methacrylate polymer, comprising the steps of:

heating said glyceride to a temperature of between about 230°–250° F.;

adding said polymer to said heated glyceride;

heating said glyceride and said polymer to a second temperature of between about 425°–700° F.;

maintaining said second temperature until a clear pill test indicates the reaction endpoint is reached; and cooling said glyceride and said polymer to form a homogenous composition.

16. The method of claim 15, wherein said glyceride to polymer ratio is from about 3:1 to 1:1 by weight.

17. The method of claim 15, wherein said glyceride is selected from the group consisting of drying oils and semi-drying oils.

18. The method of claim 15, wherein said glyceride is selected from the group consisting of linseed oil, sunflower oil, tung oil, fish oil, cottonseed oil, soybean oil and combinations thereof.

19. The method of claim 15, wherein said polymer is derived from a monomer selected from the group consisting of isobutyl methacrylate, methyl methacrylate, ethyl methacrylate, and n-butyl methacrylate and combinations thereof.

20. The method of claim 15, wherein said polymer is isobutyl methacrylate polymer.

21. The method of claim 15, and further comprising the step of adding a solvent to said cooled homogenous composition at a ratio of about 0.8–1.2 by weight.

22. A process for treating an oil spill, comprising the steps of:

applying a composition that is the homogenous thermal reaction product of a glyceride and a methacrylate polymer to spilled oil, wherein the percentage of said composition to said spilled oil ranges from about 5–15%; and allowing said composition and spilled oil to mix such that said composition coagulates said spilled oil.

23. The process of claim 22, wherein said glyceride is selected from the group consisting of drying oils and semi-drying oils.

24. The process of claim 22, wherein said polymer is isobutyl methacrylate polymer.

25. The process of claim 22, wherein said glyceride is selected from the group consisting of linseed oil, sunflower oil, tung oil, fish oil, cottonseed oil, soybean oil and combinations thereof.

26. The process of claim 22, wherein said composition further comprises a solvent.

27. A product for coagulating oil, comprising:

a porous substrate impregnated with an oil coagulant, said coagulant comprising a homogeneous reaction product of a glyceride and a methacrylate or acrylate polymer.

28. The product of claim 27, wherein said composition further comprises a solvent.

29. The product of claim 27, wherein said glyceride is selected from the group consisting of drying oils and semi-drying oils.

30. The product of claim 27, wherein said glyceride is selected from the group consisting of linseed oil, sunflower oil, tung oil, fish oil, cottonseed oil, soybean oil and combinations thereof.

31. The product of claim 27, wherein said polymer is comprised of monomers selected from the group consisting of methyl methacrylate, ethyl methacrylate, isobutyl methacrylate, and n-butyl methacrylate and combinations thereof.

32. The product of claim 27, wherein said polymer is isobutyl methacrylate polymer.

33. A method of using the product of claim 27 to coagulate oil, comprising the steps of:

applying said composition to said spilled oil such that the percentage of said composition to said spilled oil ranges from between about 5–15%; and allowing said product and said spilled oil to mix such that said product coagulates said spilled oil.

34. A method of forming a product for coagulating oil, comprising the steps of:

heating a natural glyceride to a temperature of between about 230°–250° F.;

adding a methacrylate or acrylate polymer to said heated glyceride at a glyceride to polymer ratio of between about 1:1 to 3:1 by weight;

heating said glyceride and polymer to a second temperature of between about 425°–700° F.;

maintaining said second temperature until a clear pill is formed;

cooling to form a homogenous composition; and adding a porous substrate to said homogenous composition at a ratio of composition to substrate between about 10–200% by weight.

35. The method of claim 34, wherein said substrate is selected from the group consisting of venniculite, silica, wood chips, wood pulp, paper, polystyrene, kaolin, chicken feathers, zeolite, alumina, calcium carbonate, natural fibers and synthetic fibers.

36. The method of claim 34, further comprising the step of adding a solvent to said homogenous composition prior to the addition of said composition to said substrate.

37. The method of claim 36, wherein said solvent is acetone.

* * * * *